United States Patent [19]

Machi et al.

[11] 3,933,731

[45] Jan. 20, 1976

[54] PLASTIC COMPOSITION LIBERATING REDUCED AMOUNTS OF TOXIC GAS

[75] Inventors: Sueo Machi, Takasaki; Yasushi Matui, Satte; Takayuki Shinano, Yokohama; Taiji Aono, Ichihara; Yoshiharu Hibi, Yokohama; Shozo Oshima, Iwatsuki; Masayuki Kashiki, Soka, all of Japan

[73] Assignees: Japan Atomic Energy Research Institute, Tokyo; Maruzen Oil Co. Ltd., Osaka; Mitsubishi Kakoki Kaisha Ltd., Tokyo, all of Japan

[22] Filed: Sept. 5, 1973

[21] Appl. No.: 394,419

[30] Foreign Application Priority Data

Sept. 5, 1972 Japan.............................. 47-88338

[52] U.S. Cl...... 260/40 R; 204/159.18; 204/159.19; 204/159.2; 260/37 M; 260/37 EP; 260/37 N; 260/38; 260/39 R; 260/42.24; 260/42.43; 260/42.46; 260/42.47; 260/42.49; 260/42.52

[51] Int. Cl.$^2$..................... C08L 67/00; C08K 3/06

[58] Field of Search............. 260/42.24, 40 R, 42.46

[56] References Cited

UNITED STATES PATENTS

| 3,687,890 | 8/1972 | Susuni et al. ..................... 260/42.24 |
| 3,711,438 | 1/1973 | Susuni et al. ..................... 260/42.24 |
| 3,725,336 | 4/1973 | Susuni et al. ..................... 260/42.24 |

Primary Examiner—Richard B. Turer
Attorney, Agent, or Firm—Browdy and Neimark

[57] ABSTRACT

A novel composite is disclosed which comprises a specific metal-compound additive as well as a plastic material and gypsum and/or calcium sulfite. The composite is improved in that it emits very little or substantially no toxic gas such as sulfur dioxide and hydrogen sulfide when it is burned and when the ash thereof is contacted with water.

5 Claims, No Drawings

PLASTIC COMPOSITION LIBERATING REDUCED AMOUNTS OF TOXIC GAS

This invention relates to a novel composite comprising an additive selected from metal-compounds mentioned below as well as a plastic material and a filler material selected from gypsum, calcium sulfite and a mixture thereof. More particularly, the invention relates to a novel composite which has been improved in that as a result of the addition of said metal-compound, the emission of toxic gases such as sulfur dioxide and hydrogen sulfide is eliminated or reduced, which gases are generally emitted from such composites when the composites are burned and when ash of the composite obtained following combustion is contacted with water.

Recently, "air pollution" due to toxic gases such as sulfur dioxide which is generated in a large amount in conjunction with combustion of a very large volume of petroleum products has become a serious social problem from an ecological viewpoint, and many studies have been made to solve the problem. For example, the techniques to eliminate or reduce the production of sulfur dioxide, such as "desulfurization of heavy oil", "purification of effluent gases" and the like techniques have been developed in the art, and some of these techniques have already had many practical applications. The quantity of elemental sulfur as well as of sulfur-containing compounds such as sulfur dioxide which are recovered by such techniques as mentioned above has become considerably great and now it has become a serious problem to find a process by which such recovered materials can be used most effectively.

The present inventors previously studied a process for preparing a plastic composite containing gypsum and/or calcium sulfite as filler materials, and succeeded in providing a plastic composite of superior properties containing gypsum and/or calcium sulfite as filler material, thus contributing one useful practical application of materials recovered as mentioned above.

However, subsequent studies showed that, though said composite is superior in many of desired properties, it still has a disadvantageous point in that the composite generally emits a substantial amount of sulfur dioxide when it is burned, and also it emits hydrogen sulfide when the ash remaining after combustion of said composite is contacted with water.

Though the amounts of such gases are relatively small, since such gases are very harmful to the human body, it is important to eliminate such emission or to reduce it as much as possible. It was observed that such gases were produced irrespective of the types of plastics employed in said composite and irrespective of whether gypsum or calcium sulfite is used in the composite as a filler material. The elimination or reduction of such gases would be a considerable advance in the art.

Accordingly, one object of the present invention is to provide a novel composite comprising plastic and a filler such as gypsum and/or calcium sulfite, which will emit very little or substantially no sulfur dioxide when the composite is burned, and/or emits very little or substantially no hydrogen sulfide when ash of the composite obtained following combustion is contacted with water.

Another object of the present invention is to provide a process for preparing such a novel composite as mentioned above.

The above and the other objects of the present invention can be attained by incorporating a small amount of at least one metal-compound as a specific additive selected from the group consisting of oxides (including peroxides), hydroxides, carbonates and chlorides of specific metals as well as double salts of such metals in the composite comprising a plastic and a filler selected from gypsum, calcium sulfite and a mixture thereof.

The present inventors have made many studies, repeating a series of systematic experiments to find a method for eliminating or reducing the emission from the composite of said toxic gases, and have found that by incorporating a small amount of a specific metal-compound in the composite, it is possible to eliminate or reduce the emission of sulfur dioxide during combustion and/or the emission of hydrogen sulfide upon contact of ash of the composite with water.

In accordance with the present invention, by selecting the metal-compound to be used in the composite and controlling the amount thereof, the emission of said toxic gases can be eliminated or reduced.

Such effect of the present invention is ascribed to the fact that sulfur dioxide generated during combustion of the composite or hydrogen sulfide generated during contact of the ash of the composite with water readily react in said composite with said metal-compound incorporated therein as an additive and is changed into a stable compound which remains in the composite and as a result very little or substantially none of said gases is emitted into the air from the composite.

With the above in mind, the present inventors have made a study to find specific compounds which can be incorporated in the composite without impairing desired properties of such composite such as mechanical strength and which can react with sulfur dioxide produced by combustion of the composite or with hydrogen sulfide produced by the contact of the ash of said composite with water to produce stable compounds which can be settled in the composite instead of being emitted therefrom as toxic gases.

And we found that oxides, hydroxides, carbonates, chlorides and double salts of metals, especially of those metals which belong to either of Groups I, II, IV, V, VI, VII and VIII of the Periodic Table are effective for the purpose of eliminating or reducing the emission of both of said toxic gases.

We also found that almost all of the metal-compounds such as oxides (including peroxides), hydroxides, carbonates and chlorides as well as double salts, of the following metals are effective for eliminating or reducing the emission of hydrogen sulfide from the composite. That is, in the practice of the present invention, useful metal-compounds for preventing or decreasing the emission of hydrogen sulfide include oxides (including peroxides) of metals such as $BaO$, $BaO_2$, $CaO$, $CuO$, $Cu_2O$, $MnO_2$, $PbO$, $FeO$, $Fe_2O_3$, $Ni_2O_3$, $CoO$, $SeO_2$, $TiO_2$ and the like; hydroxides of metals such as $Ca(OH)_2$, $Bi(OH)_3$ and the like; carbonates of metals such as $CaCO_3$, $MnCO_3$, $CdCO_3$, $ZnCO_3$, $Na_2CO_3$ and the like; chlorides of metals such as $ZnCl_2$, $SnCl_2 \cdot 2H_2O$ and the like; and double salts of metals such as $2PbCO_3 \cdot Pb(OH)_2$ and the like; and mixtures thereof; $BaO_2$, $BaO$, $CaO$, $Cu_2O$, $CuO$, $FeO$, $CoO$, $Ca(OH)_2$, $Bi(OH)_3$, $CdCO_3$, $CoCO_3$, $MnCO_3$, $NaCO_3$, $CaCO_3$, $SnCl_2 \cdot 2H_2O$, $2PbCO_3 \cdot Pb(OH)_2$ and mixtures thereof being preferred; and $BaO_2$, $BaO$, $CaO$, $Cu_2O$, $Ca(OH)_2$, $CdCO_3$, $CaCO_3$ and mixtures thereof being most preferred.

In the practice of the present invention, useful compounds for preventing or decreasing the emission of sulfur dioxide resulting from combustion of said composite include the compounds such as oxides, hydroxides, carbonates, chlorides, double salts and the like compounds of such metals as calcium, barium, bismuth, copper, zinc, cadmium, cobalt, nickel and the like.

None of these metal compounds alone can always eliminate or reduce the emission of both of said toxic gases. But a combination of any two or more of said metal compounds may be advantageously incorporated in said composite. Accordingly, if one of said metal compounds is extremely effective for eliminating or reducing the emission of hydrogen sulfide but is not sufficiently effective for eliminating or reducing the emission of sulfur dioxide, a combination of said metal compound and other member selected from said metal compounds which is sufficiently effective for eliminating or reducing the emission of sulfur dioxide may be advantageously incorporated in said composite for eliminating or reducing the emission of both of said toxic gases.

Such additives of metal compounds can be effectively incorporated in either the composite comprising gypsum or the composite comprising calcium sulfite. But, since a smaller amount of said toxic gases is usually emitted from the former composite than from the latter composite, it is expected that the resulting composite will emit substantially no or at least a very small amount of said toxic gases, if the former composite is modified by incorporating said additives of metal compounds therein.

The rate of addition of said additives into said composite, which is expressed in terms of percentage of the weight of the additives of metal compounds to the total weight of said additives and the filler of gypsum and/or calcium sulfite, can be within the range of from about 0.5 to about 60%, preferably from about 1 to about 40%.

Any of the conventional methods can be used for incorporating said additive in said filler material before preparing said composite by mixing said filler composition containing said additive with a plastic material. For example, powder of the filler material is admixed with powder of an additive, and the resulting mixture is admixed with a plastic material by any convenient mechanical means to give a composite having the desired composition.

It was observed that mechanical properties of said composite usually desired for such material were not substantially impaired by the addition of said metal compound.

Useful plastics which can be used in the practice of the present invention include thermoplastic resins such as polyvinyl chloride, polyvinyl acetate, polystyrene, ABS (acrylonitrile-butadiene-styrene) resin, polyethylene, polypropylene, nylon and the like as well as thermosetting resins such as phenol resin, melamine resin, urea resin, unsaturated polyester resin, epoxy resin and the like. Preferable plastics include polyethylene including low density polyethylene and high density polyethylene, polypropylene, unsaturated polyester and the like.

A suitable mixing ratio of said plastic and said filler composition containing said additive is from about 50 : 50 to about 2 : 98.

Suitable compounds which can be advantageously used as filler materials in the practice of the present invention include, for example, gypsum obtained as byproduct in the process for preparing phosphuric acid; calcium sulfite obtained as byproduct in the process of desulfurization of petroleum products, gypsum obtained as byproduct in the process of desulfurization of sulfur compounds, gypsum and calcium sulfite which are prepared from sulfur dioxide recovered from stack gases generated in various industries and the like. Other chemical products as well as naturally occurred gypsum can also be used advantageously.

These gypsum and calcium sulfites usually contain very small amount of impurities. The amount of impurities other than the compounds of calcium is especially low. For example, calcium phosphate constitutes the largest part of the impurities comprising calcium which are present in said gypsum as byproduct from the process of phosphuric acid; the remaining part is occupied by such other compounds as calcium oxide, calcium hydroxide, calcium carbonate and the like compounds of calcium and these constitute only around 0.1% at the greatest of the total weight of the gypsum. Also, the gypsum or calcium sulfite which is produced as byproduct in the processes of the petroleum industry usually possesses a high degree of purity and the content of impurities such as calcium oxide, calcium hydroxide, calcium carbonate and the like is at most about 0.1% by weight in total based on the total weight of said gypsum or calcium sufite.

It is believed that metal compounds such as calcium oxide, calcium hydroxide, calcium carbonate and the like which are originally present in the gypsum or calcium sulfite as impurities are also effective for eliminating or reducing the emission of said toxic gases. And so, when it is desired to control the content of metal compounds as additives to be 1% by weight based on the weight of the gypsum or calcium sulfite in the case of using the gypsum or calcium sulfite originally containing 0.1% by weight (based on the total weight of said gypsum or calcium sulfite) of such metal compounds as impurities, the 0.9% by weight of such metal compounds that is lacking must be added to the gypsum or calcium sulfite from an extraneous source.

The invention is further illustrated by the following examples of preferred embodiments thereof, although it will be understood that these examples are included merely for purposes of illustration and are not intended to limit the scope of the invention unless otherwise specifically indicated.

The composite of the present invention can be molded into any suitable shape and size before it is cured by any conventional means for curing plastic materials, such as using chemical reagents such as peroxides, azo-compounds, etc.; application of heat; irradiation by light as well as irradiation with ionizing radiation such as $\alpha$-ray, $\beta$-ray, $\gamma$-ray, accelerated electron beam and the like.

EXAMPLES 1 – 30

Test pieces for combustion test were prepared by mixing 50 parts by weight of commercially available low density polyethylene (Sumikathen, available from Sumitomo Chemical Co., Ltd.) with 50 parts by weight of a filler composition comprising calcium sulfite and various additives of the types and in amounts recited in the following table, kneading the mixture thus obtained in the Brabender mixer operated at 160°C for 15 minutes, and then molding the mixture into a sheet 1 mm thick at 160°C with the pressure of 150 kg/cm². Then, each sample was burned to check for the amount of sulfur dioxide which was emitted during combustion of the test piece and the amount of hydrogen sulfide which was emitted when the ash of the test piece was contacted with water. The amount of toxic gases emitted in the above test were determined as follows.

i. Sulfur dioxide

Each sample was burned in a stream of air at 500°C, and the gas emitted during combustion was induced into the solution comprising potassium iodide and starch to be absorbed therein. Then the solution was titrated using a standard solution of potassium iodate to determine the amount of sulfur.

ii. Hydrogen sulfide

Each sample was burned in an air stream at 550°C for 2 hours and then 2 g portion of the resulting ash was collected. Then 3 ml of water was poured on said 2 g of the ash and agitated for 10 seconds. The resulting suspension was allowed to stand for the following 40 minutes and the supernatant solution was collected to be separated by gas chromatography (using electron trapping type-detector). The amount of hydrogen sulfide emitted from the sample was determined by using hydrogen sulfide-detecting tube which was applied to said separated solution.

The results of the tests were as recited in the following Table 1.

Table 1

Toxic gases emitted upon burning of the composite comprising calcium sulfite and polyethylene and upon contacting the ash thereof with water.

| Example No. | Additive | Amount of** additive (%) | Amount of toxic* gases emitted SO$_2$ (wt %) | H$_2$S (wt %) |
|---|---|---|---|---|
| 1 | None | — | 0.47 | 0.026 |
| 2 | BaO$_2$ | 2 | 0.36 | 0.023 |
| 3 | BaO$_2$ | 40 | 0.01 | 0.007 |
| 4 | BaO | 40 | 0.01 | 0.020 |
| 5 | CaO | 2 | 0.24 | 0.009 |
| 6 | CaO | 40 | 0.01 | 0.010 |
| 7 | Ca(OH)$_2$ | 8 | 0.06 | 0.010 |
| 8 | Cu$_2$O | 2 | 0.28 | 0.005 |
| 9 | CuO | 2 | 0.34 | 0.007 |
| 10 | CaO$_3$ | 40 | 0.36 | 0.005 |
| 11 | MnO$_2$ | 2 | 0.31 | 0.017 |
| 12 | 2PbCO$_3$.Pb(OH)$_2$ | 2 | 0.44 | 0.007 |
| 13 | CdCO$_3$ | 2 | 0.25 | 0.010 |
| 14 | FeO | 40 | 0.31 | 0.010 |
| 15 | Fe$_2$O$_3$ | 2 | 0.43 | 0.023 |
| 16 | ZnCl$_2$ | 4 | 0.35 | 0.007 |
| 17 | SnCl$_2$.2H$_2$O | 2 | 0.24 | 0.005 |
| 18 | Ni$_2$O$_3$ | 2 | 0.26 | 0.010 |
| 19 | CoCO$_3$ | 2 | 0.24 | 0.005 |
| 20 | CoO | 2 | 0.41 | 0.007 |
| 21 | Bi(OH)$_3$ | 2 | 0.12 | 0.007 |
| 22 | SeO$_2$ | 2 | 0.43 | 0.023 |
| 23 | CdCO$_3$ Na$_2$CO$_3$ | 2 4 | 0.33 | 0.010 |
| 24 | Ca(OH)$_2$ ZnCO$_3$ | 5 5 | 0.07 | 0.004 |
| 25 | BaO TiO$_2$ | 2 2 | 0.28 | 0.021 |
| 26 | MnO$_2$ Ca(OH)$_2$ | 2 2 | 0.26 | 0.007 |
| 27 | PbO BaO$_2$ | 2 2 | 0.20 | 0.007 |
| 28 | MnCO$_3$ Na$_2$CO$_3$ | 2 2 | 0.23 | 0.014 |
| 29 | CuO BaO | 2 2 | 0.24 | 0.004 |

Table 1 – Continued

| Example No. | Additive | Amount of** additive (%) | Amount of toxic* gases emitted SO$_2$ (wt %) | H$_2$S (wt %) |
|---|---|---|---|---|
| 30 | CdCO$_3$ CaO | 2 2 | 0.10 | 0.005 |

*The amount of gas emitted recited in the Table is in terms of percentage of the weight of elemental sulfur contained in the gas emitted to the weight of the ash of each test piece remained after combustion thereof, said weight of elemental sulfur being calculated from the amount of the gas emitted which was determined according to the procedures as mentioned above.
**The amount of additive is shown in terms of percentage of the weight of said additive to the total weight of said additive and filler material (calcium sulfite).

EXAMPLES 31 – 41

Test pieces for combustion test were prepared by mixing commercially available low density polyethylene (Sumikathen as mentioned in Examples 1 – 30) and gypsum compositions containing various additives in the proportion of 1 : 1 by weight and the mixture was kneaded by Brabender mixer operated at 160°C for 15 minutes, followed by molding the mixture into pieces of sheet 1 mm thick at 160°C and 150 kg/cm². The quantity of toxic gases emitted from these test pieces was determined as described in the previous Examples 1 – 30. The results of the test were as recited in the following Table 2.

Table 2

Toxic gases emitted upon burning of the composite comprising gypsum and polyethylene and upon contacting the ash thereof with water.

| Example No. | Additive | Amount of additive (%) | Amount of toxic gases emitted SO$_2$ (wt %) | H$_2$S (wt %) |
|---|---|---|---|---|
| 31 | None | — | 0.01 | 0.012 |
| 32 | CaO | 2 | <0.01 | 0.003 |
| 33 | Ca(OH)$_2$ | 2 | <0.01 | 0.002 |
| 34 | PbO | 1 | <0.01 | 0.002 |
| 35 | 2PbCO$_3$.Pb(OH)$_2$ | 1 | <0.01 | 0.002 |
| 36 | Cu$_2$O | 1 | <0.01 | 0.002 |
| 37 | CdCO$_3$ | 1 | <0.01 | 0.003 |
| 38 | Ni$_2$O$_3$ | 1 | <0.01 | 0.004 |
| 39 | CoCO$_3$ | 1 | <0.01 | 0.004 |
| 40 | MnO$_2$ | 1 | <0.01 | 0.003 |
| 41 | Bi(OH)$_3$ | 1 | <0.01 | 0.002 |

EXAMPLE 42

Sample A was prepared by mixing 30 parts by weight of commercially available low density polyethylene (Sumikathen as mentioned in Examples 1 – 30) and 70 parts by weight of calcium sulfite and kneading the resultant mixture in a Brabender mixer operated at 160°C for 15 minutes followed by molding the mixture into a sheet 1 mm thick at 160°C with the pressure of 150 kg/cm². Then, sample B was prepared in the same manner as mentioned above except that the filler composition comprising 66 parts by weight of calcium sulfite and 4 parts by weight of calcium hydroxide as an additive was employed instead of 70 parts by weight of calcium sulfite. Then, with respect to said two samples, the amount of sulfur dioxide emitted during combustion and the amount of hydrogen sulfide emitted upon contact of the ash of the sample with water were measured in the same manner as mentioned in the previous Examples. The results were as recited in the following Table 3.

Table 3

| Test Piece | Resin | Filler | Additive | Amount of toxic gases emitted | |
|---|---|---|---|---|---|
| | | | | SO$_2$ (wt %) | H$_2$S (wt %) |
| A | low density polyethylene 30% | calcium sulfite 70% | Ca(OH)$_2$ — | 0.58 | 0.031 |
| B | 30% | 66% | 4% | 0.09 | 0.010 |

EXAMPLE 43

Experiments similar to those in Example 42 were repeated in the same manner under the conditions as recited below and in the following Table 4. Commercially available high density polyethylene (Sholex, available from Showa Denko K.K.) was used instead of the low density polyethylene used in the previous example and Bi(OH)$_3$ used in said example.

Test piece C was prepared by mixing 50 parts by weight of said high density polyethylene and 50 parts by weight of filler material comprising calcium sulfite only. Test piece D was prepared in the same manner but using a mixture of calcium sulfite and Bi(OH)$_3$ instead of calcium sulfite only. The results were as recited in the following Table 4.

Table 4

| Test Piece | Resin | Filler | Additive | Amount of toxic gases emitted | |
|---|---|---|---|---|---|
| | high density polyethylene (% by weight) | calcium sulfite (% by weight) | Bi(OH)$_3$ | SO$_2$ (wt %) | H$_2$S (wt %) |
| C | 50 | 50 | — | 0.47 | 0.025 |
| D | 50 | 48 | 2% | 0.11 | 0.007 |

The result of the above table clearly shows that the emission of both sulfur dioxide and hydrogen sulfide can be remarkably reduced by the addition of a small amount of Bi(OH)$_3$.

EXAMPLE 44

Experiments similar to those mentioned in Example 43 above were repeated except that polypropylene was used, a kneading temperature of 190°C was employed and some other experimental conditions were as recited in the following Table 5.

Table 5

| Test Piece | Resin | Filler | Additive | Amount of toxic gases emitted | |
|---|---|---|---|---|---|
| | | | | SO$_2$ (wt %) | H$_2$S (wt %) |
| E | polypropylene 50% | calcium sulfite 50% | CaO — | 0.49 | 0.029 |
| F | 50% | 48% | 2% | 0.23 | 0.010 |

EXAMPLE 45

Test piece G was prepared by mixing 60 parts by weight of commercially available unsaturated polyester and 40 parts by weight of calcium sulfite, and molding the resultant mixture into a sheet 1 mm thick followed by curing the molded material by irradiating it with an electron beam at a dose rate of 2 × 10$^5$ rad/sec for a total dose of 10 M rad. Test piece H was prepared in the same manner as mentioned above except that the composition of the molded material was as recited in the following Table 6. Then, both of said two test pieces were burned as in Example 1 and the amount of toxic gases emitted therefrom was determined as in Example 1. The results were as recited in the following Table 6.

Table 6

| Test piece | Unsaturated polyester | Calcium sulfite | Additive Ca(OH)$_2$ | Amount of toxic gases emitted | |
|---|---|---|---|---|---|
| | | | | SO$_2$ (wt %) | H$_2$S (wt %) |
| G | 60% | 40% | — | 0.37 | 0.021 |
| H | 60% | 38% | 2% | 0.08 | 0.009 |

The above table clearly shows that the emission of sulfur dioxide and hydrogen sulfide can also be remarkably reduced by the addition of a specific metal compound according to the present invention, in the case of using a cured composite comprising unsaturated polyester and calcium sulfite.

What is claimed is:

1. A composite comprising (1) from about 2 to about 50 parts by weight of a plastic material selected from the group consisting of thermoplastic resins and thermosetting resins, and (2) from about 50 to about 98 parts by weight of a filler composition comprising (i) gypsum and/or calcium sulfite and (ii) an additive of calcium hydroxide in an amount of from about 0.5 to about 60% by weight based on the total weight of said filler composition, characterized in that said composite is improved in that, due to the presence of said additive it emits very little or substantially no sulfur dioxide when it is burned, and also emits very little or substantially no hydrogen sulfide when the ash of said composite remaining after combustion thereof is contacted with water, in spite of the fact that like composites of the prior art usually emit toxic gases when burned or when their ash is contacted with water.

2. The composite of claim 1 in which said plastic material is selected from the group consisting of polyethylene, polypropylene and unsaturated polyester.

3. A process for preparing a composite comprising (1) a plastic material and (2) a filler composition comprising (i) gypsum and/or calcium sulfite and (ii) an additive of calcium hydroxide, said process comprising adding about 0.5 to about 60% of the total weight of said filler composition of said calcium hydroxide additive to a filler material comprising gypsum and/or calcium sulfite to make said filler composition, mixing from about 2 to about 50 parts by weight of a plastic material with from about 50 to about 98 parts by weight of said filler composition, and then kneading the mixture thus obtained in a kneader at a temperature within the range of from about 80°C to about 200°C for a period of from about 1 minute to about 30 minutes.

4. The process of claim 3 in which said plastic material is selected from the group consisting of polyethylene, polypropylene and unsaturated polyester.

5. A composite in accordance with claim 1, wherein said plastic material is a thermoplastic resin and said gypsum and/or calcium sulfite is calcium sulfite.

* * * * *